United States Patent [19]
Cox

[11] 3,805,867

[45] Apr. 23, 1974

[54] TIRE CHAIN ATTACHING MEANS

[76] Inventor: Adrian H. Cox, P.O. Box 122, Baker, Oreg. 97905

[22] Filed: Aug. 2, 1972

[21] Appl. No.: 277,282

[52] U.S. Cl.............. 152/213 R, 152/239, 152/241
[51] Int. Cl............................................. B60c 27/14
[58] Field of Search .......... 152/241, 239, 219, 217, 152/213

[56] References Cited
UNITED STATES PATENTS
2,493,263  1/1950  Prehn................................. 152/241
2,429,720  10/1947  Holtz................................. 152/241
2,984,280  5/1961  Emmerich........................... 152/241

Primary Examiner—James B. Marbert
Attorney, Agent, or Firm—John W. Kraft; Charles L. Kraft

[57] ABSTRACT

The tire chain attaching means comprises a rimband assembly having a ring-like configuration formed by a plurality of suitably joined leaves, a circumferential chain similar in circumference to the rimband, and a plurality of transverse chains fastened between the rimband and the circumferential chain.

2 Claims, 6 Drawing Figures

ADRIAN H. COX    INVENTOR.

ADRIAN H. COX INVENTOR.

BY

TIRE CHAIN ATTACHING MEANS

FIELD OF INVENTION

The present invention relates to tire chains, and more particularly to tire chains which include a rimband operable to provide a framework for a chain web.

BRIEF DESCRIPTION OF THE PRIOR ART

Tire chains have included a pair of circumferential chains held in a parallel relationship by a plurality of transversely disposed transverse chains. The terminal ends of the circumferential chains may be held by a variety of detachable locking links. These tire chains are installed on the tire by disposing the web of circumferential and transverse chains about the tire and fastening the terminal ends of the respective circumferential chains into a ring-like circle. The tire chain is retained on the tire by an elastic tension band operable to provide interiorly directed force. In practice, these tire chains shift substantially and rub against the wheel and tire causing extensive wear and have tended to separate as a result of characteristic elasticity of the simple chain framework of the circumferential chain rings. Chain framework on the interior side of the wheel rubs and may conflict with the means mounting the wheel to the axle.

Accordingly, it is an object of the present invention to provide a rimband framework on one of the terminal sides operable to provide a rigid framework for the transverse chains of a tire chain apparatus.

It is another object of this invention to provide a ringband which includes adjusting means operable to adjust the circumference of the rimband to be substantially similar to the circumference of the metal wheel of a commonly known tire.

These and other objects shall become apparent from the description following, it being understood that modifications may be made without affecting the teachings of the invention here set out.

SUMMARY OF INVENTION

The tire chain attaching means comprises a rimband assembly having a ring-like configuration formed by a plurality of suitably joined leaves, a circumferential chain similar in circumference to the rimband, and a plurality of transverse chains fastened between the rimband and the circumferential chain. The rimband assembly may include a pair of adjusting leaves disposed about a central body leaf, and a pair of pivotal leaves provided with adjusting means to suitably change the curvature and circumference of the rimband assembly.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
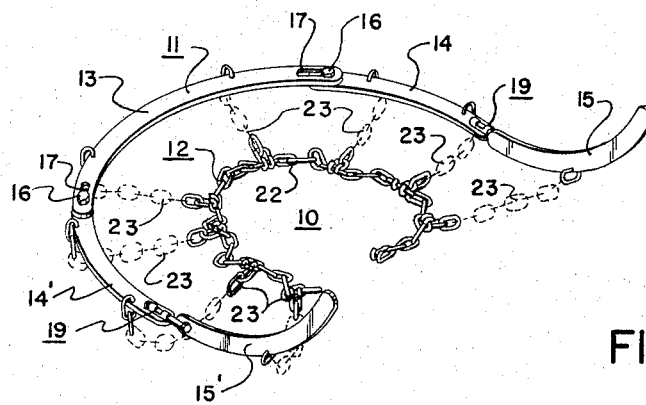
FIG. 1 is a perspective view of the tire chain attaching apparatus including a portion of the chains in broken lines for illustrative purposes.
Figure 2:
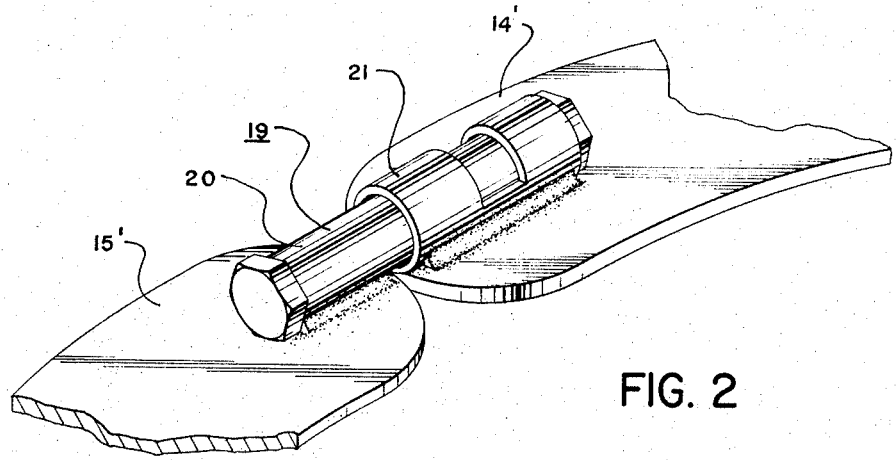
FIG. 2 is a fragmentary perspective view of the body leaf and adjusting leaf of this invention, including the locking bolt.
Figure 3:
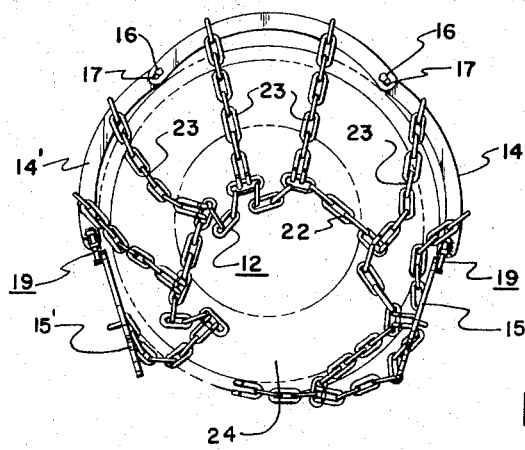
FIG. 3 is a side elevational view of the tire chain attaching apparatus shown in mounting position including a commonly known tire in broken lines for illustrative purposes.
Figure 6:
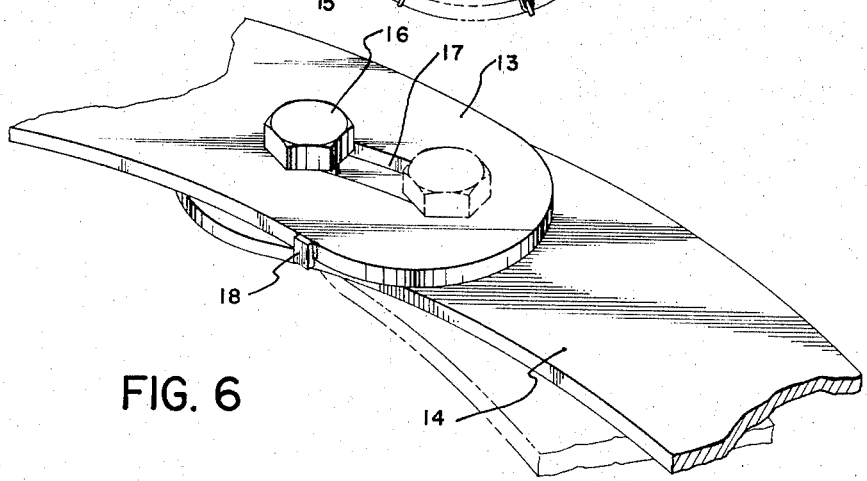
FIG. 6 is a fragmentary perspective view of the adjusting leaf and pivotal leaf connected by the pivotal hinge means thereof illustrating the locked position in broken lines for illustrative purposes.

Referring now to the drawings and, more particularly, to the FIG. 1, the tire chain attaching means of this invention is shown to advantage and generally identified by the numeral 10. The attaching means 10 includes a rimband assembly 11 and a chain web 12. The rimband assembly 11 has a substantially ring-like configuration similar in curvature and circumference to the circumference of the ring band wheel rim. The rimband assembly 11 provides the framework for the chain web 12. The rimband assembly 11 comprises a body leaf 13, a pair of adjustable leaves 14 and 14', and a pair of pivotal leaves 15 and 15'. The body leaf 13 is a curved metal strip. The adjusting leaves 14 and 14' are also curved strips having substantially the same curvature as the body leaf 13. As shown by the FIGS. 3 and 6, the adjusting leaves 14 and 14' are fastened to the body leaf 13 by means of a locking bolt 16. A pair of curvedly configured slots 17 is disposed in the central rectilinear axis of the body leaf 13 distally from its terminal ends. The locking bolts 16 are operable to slidably engage the slots 17. The means locking the bolt 16 may be a threaded hole in the respective adjusting leaves 14 and 14' distally from their respective terminal ends or a nut (not shown) which is threadable with the locking bolt 16 after it has been engaged with the body leaf 13 and holes disposed distally from the terminal ends of the respective adjusting leaves 14 and 14'. In practice, it has been found to advantage that the locking bolt 16 should be recessed on its wheel contacting side to minimize wear between the rimband assembly 11 and a wheel. The circumference of the rimband assembly 11 may be selectively adjusted, as shown by the broken lines in the FIG. 6, by sliding the adjusting leaves 14 and 14' with respect to the body leaf 13 and then locking the leaves 13 and 14 and 14' by tightening the locking bolt 16. A guide means 18, shown more clearly in the FIG. 6, may be fastened to the terminal sides of the body leaf 13 to facilitate alignment of the body leaf 13 and the adjusting leaves 14 and 14'.

Referring again to the FIG. 1, the pivotal leaves 15 and 15' are operable to rotate at their predetermined points of pivot to permit the rimband assembly to pass over the wheel and to close into a ring, as set out above. Similarly to the adjusting leaves 14 and 14', the pivotal leaves 15 and 15' are curved metal strips following the same curvature as the body leaf 13. The respective pivotal leaves 15 and 15' pivot along their rectilinear axis at the terminal ends of the adjusting leaves 14 and 14' opposite the locking bolt 16. The pivot means may include a hinge 19. The hinge 19 comprises a hinge bolt 20 and a bolt sleeve 21. The hinge bolt 20 is fastened by means such as a weld rectilinearly on the terminal side opposite the wheel contacting side of the pivotal leaves 15 and 15' at its terminal end adjacent the adjusting leaf 14. The hinge sleeve 21 is a substantially cylindrical guide in which the bolt 20 may turn. The sleeve 21 is fastened on the terminal side opposite the wheel contacting side of the adjusting leaf 14 at its terminal end opposite the locking bolt 16. It is to be understood that the pivot is on the rectilinear axis of the rimband assembly 11 because when the tire chain attaching means 10 is installed, the forces of the chain web 12, hereinafter described, are transverse. It is also to be understood that a rimband 11 may include only a body leaf 13 and pivotal leaves 15 and 15' and hinges 19.

Referring again to the FIG. 1, the chain web 12 comprises a circumferential chain 22 and a plurality of transverse chains 23. The circumferential chain 22 is disposed substantially parallelly to the rimband assembly 11 and has substantially the same circumference as the rimband assembly 11. The circumferential chain 22 is operable to provide a circular framework, similar to the rimband assembly 11, for the respective transverse chains 23. The circumferential chain 22 may be a closed ring of fastened links or it may be provided with a separating link commonly known in the art. The transverse chains 23 are fastened equidistally at intervals between the ring-like rimband assembly 11 and the circumferential chain 22. The transverse chains 23 provide the traction for the tire chain attaching means 10.

Figure 4:
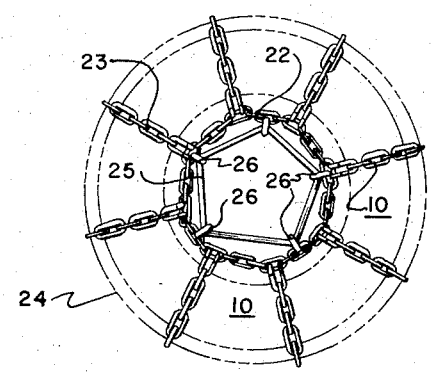
FIG. 4 is a side elevational view of the chain web of the tire chain attaching means shown in its installed configuration about a tire shown in broken lines for illustrative purposes.
Figure 5:
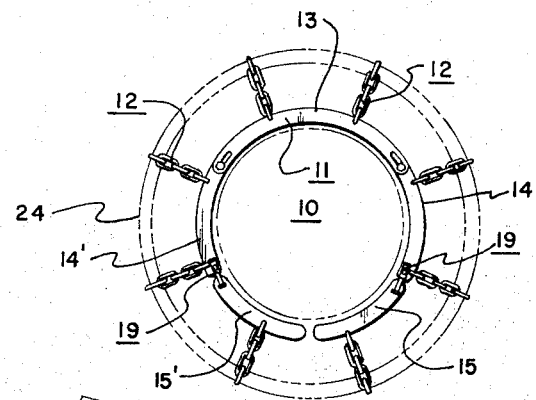
FIG. 5 is a side elevational view of the side opposite the FIG. 4 showing the rimband assembly and tire chain web of this invention installed on a wheel for illustrative purposes.

Referring now to the FIGS. 4 and 5, the tire chain attaching apparatus may be installed on a commonly known automotive wheel and tire 24 by pivoting the pivotal leaves 15 and 15' so that the rimband assembly is in an open curved substantially U-shaped configuration. The rimband assembly 11 may then be disposed over the rearwardmost terminal side of the wheel 24 and the pivotal leaves 15 and 15' can be closed into a ring-like band as shown in the FIG. 5. The circumferential chain 22 may then be closed as described earlier. As shown in the FIG. 4, it has been found to advantage to include a tension band 25 operable to provide continuous centrally directed force on the circumferential chain 22 to maintain the transverse chains 23 in their alignment about the tire 24. The tension band 25 may be held on the circumferential chain 22 by means of band-attaching hooks 26.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A tire chain attaching means, comprising:

a rimband assembly having a substantially ring-like configuration, said rimband assembly including a body leaf and a pair of pivotal leaves mounted to said body leaf by means of suitable hinges, said hinges being operable to pivot each of said pivotal leaves on their rectilinear axis with respect to the body leaf; and a chain web including a circumferential chain of substantially the same circumference as said rimband, and a plurality of transverse chains fastened between said circumferential chain and said rimband assembly at intervals over the circumference of the tire chain attaching means.

2. The apparatus of claim 1 including an elastic tension band operable to engage said circumferential chain and to provide centrally directed force to maintain the transverse chains in their alignment on a tire.

* * * * *